March 19, 1963    R. C. GOODMAN ETAL    3,081,686
MICROFILM DUPLICATING APPARATUS
Filed Nov. 24, 1958    9 Sheets-Sheet 2

INVENTORS
ROBERT C. GOODMAN
EMILIO G. MASTROIANNI
BY
ATTORNEYS

INVENTORS
ROBERT C. GOODMAN
EMILIO G. MASTROIANNI
BY
ATTORNEYS

March 19, 1963 R. C. GOODMAN ETAL 3,081,686
MICROFILM DUPLICATING APPARATUS
Filed Nov. 24, 1958 9 Sheets-Sheet 4
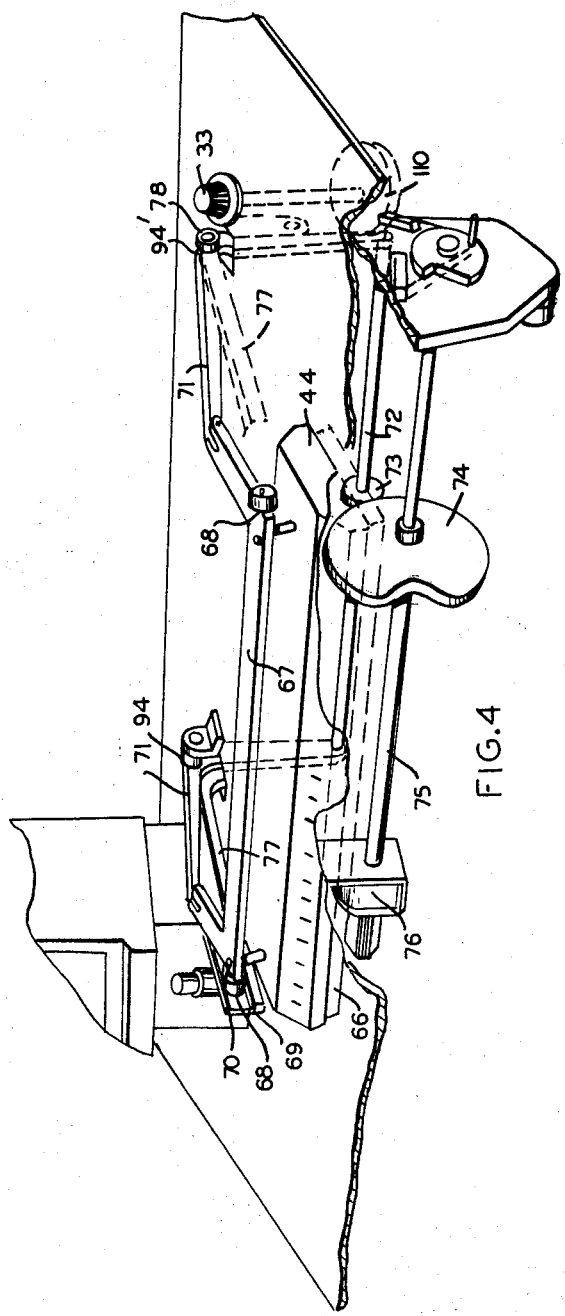
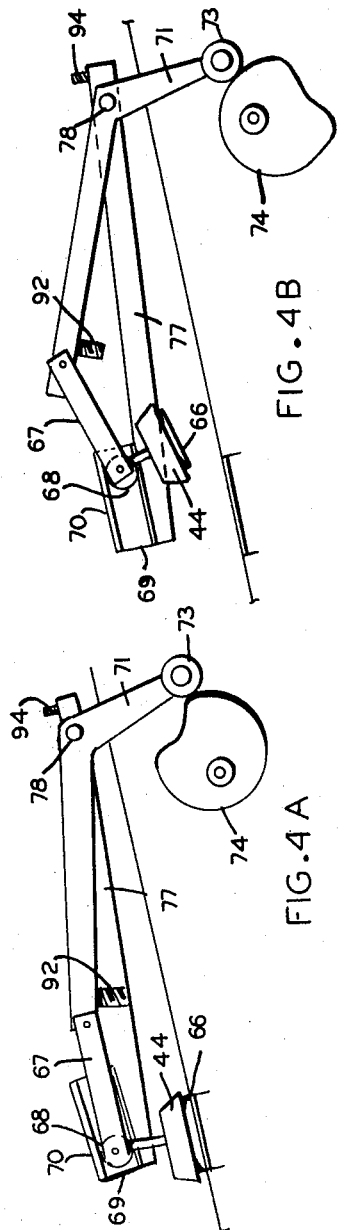
INVENTORS
ROBERT C. GOODMAN
EMILIO G. MASTROIANNI
BY
ATTORNEYS

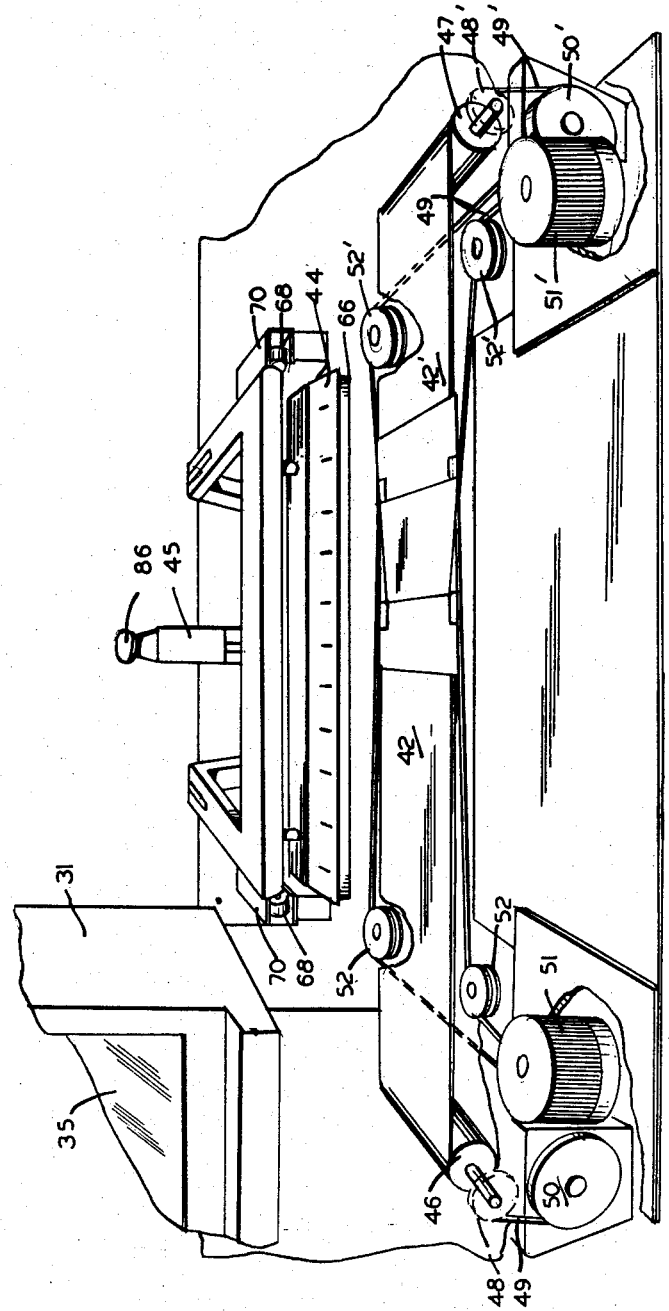

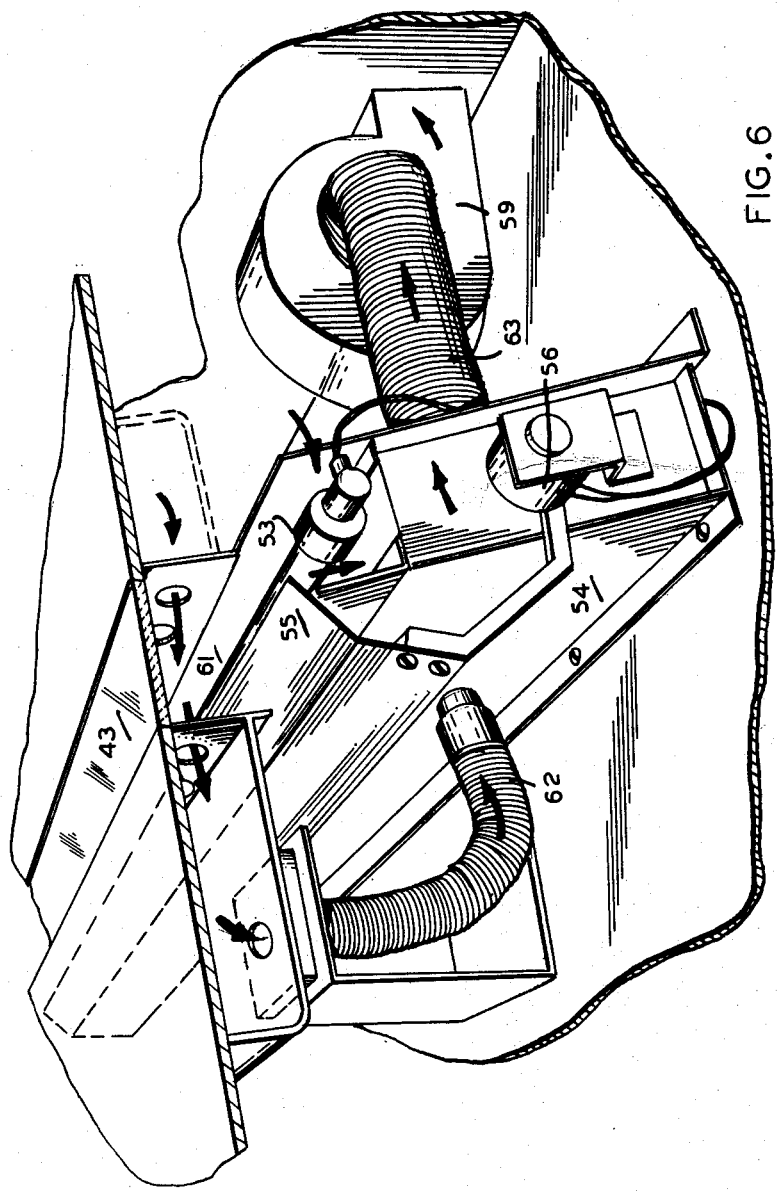

March 19, 1963  R. C. GOODMAN ETAL  3,081,686
MICROFILM DUPLICATING APPARATUS
Filed Nov. 24, 1958  9 Sheets-Sheet 7

INVENTORS
ROBERT C. GOODMAN
EMILIO G. MASTROIANNI
BY
ATTORNEYS

March 19, 1963  R. C. GOODMAN ETAL  3,081,686
MICROFILM DUPLICATING APPARATUS

Filed Nov. 24, 1958  9 Sheets-Sheet 8

INVENTORS
ROBERT C. GOODMAN
EMILIO G. MASTROIANNI

BY

ATTORNEYS

United States Patent Office 3,081,686
Patented Mar. 19, 1963

3,081,686
MICROFILM DUPLICATING APPARATUS
Robert C. Goodman, Binghamton, and Emilio G. Mastroianni, Endicott, N.Y., assignors to General Aniline & Film Corporation, New York, N.Y., a corporation of Delaware
Filed Nov. 24, 1958, Ser. No. 775,961
1 Claim. (Cl. 95—73)

This invention relates to a new and novel method and apparatus for printing microfilm from roll to card stock film. More specifically, this invention relates to a method and apparatus for printing microfilm whereby any portion of any frame of several sizes of film apertures can be reproduced automatically from a roll of such film.

It is an object of this invention to provide a method and apparatus for printing microfilm which is timesaving and by the use of which a relatively inexperienced operator may select, scan, view, enlarge and print specific frames of the microfilm with a minimum of manual operation and without excessive cuffing, editing and splicing.

A further object of this invention is to provide a method and apparatus for printing roll stock microfilm onto cards, which method and apparatus are for the most part automatic in operation and which with only minor changes may be adapted to print roll to roll.

It is a still further object of this invention to provide a microfilm printing machine having an automatic platen which can move up or down to hold an original and a card flat and firmly together with no air pockets between the two so that a precise uniform pressure is exerted on the original and card to be printed.

Another object of this invention is to provide an apparatus for printing microfilm provided with means for masking out unwanted portions of the film to be printed which means includes a control to activate a shade mechanism which is spring loaded to enable it to return easily upon manual operation.

Still another object of this invention is to provide an automatic card travel mechanism which will handle the vertical indexing of roll to card printing in conjunction with the shade for horizontal indexing.

It is also an object of this invention to provide a viewer unit for viewing and identifying microfilm.

It is a still further object of this invention to provide a film frame selection device and a simplified system of transferring the selected image to be printed to the desired printing area.

It is still another object of this invention to provide an efficient and novel method of cooling the printing surface, light source and other components of the printing machine by circulation of air in order to maintain proper temperatures.

It is also an object of this invention to provide a novel automatic lamp shutter mechanism which will remain closed until a timing device activates the shutter and holds it open for the desired exposure time, and then closes to complete the exposure cycle.

An additional object of this invention is to provide an automatic slack take-up device for use with roll film, one that is capable of eliminating any and all slack in a roll stock printing machine.

Other objects and features will be apparent from the following description of the invention, pointed out in particularity in the appended claims, and taken in connection with the accompanying drawings, in which:

FIG. 4 is a perspective view of the platen and operating means therefor with parts broken away;

FIGS. 4a and 4b are cross-sectional views of the platen showing the operating means therefor;

FIG. 5 is a perspective view of the film shade mechanism and related control knobs;

FIG. 6 is a detail view, partly in section, showing the lamp housing, shutter, air flow system and platen cooling chamber;

Essentially, the apparatus, in accordance with the invention, has the purpose of printing one or more selected picture elements of a length of relatively narrow microfilm onto a sensitized card stock, which both in length and width accommodates several picture elements. Means are provided for placing the sensitized card stock over and in contact with a length of the microfilm unwound from a roll and supported on a translucent plate for exposure. The card supporting means permit the placement of the card transverse to the film in various positions for the printing of one or more selected picture elements over any desired portion of the card. Means are also provided for masking the unwanted picture elements of the length of film.

Figure 1:
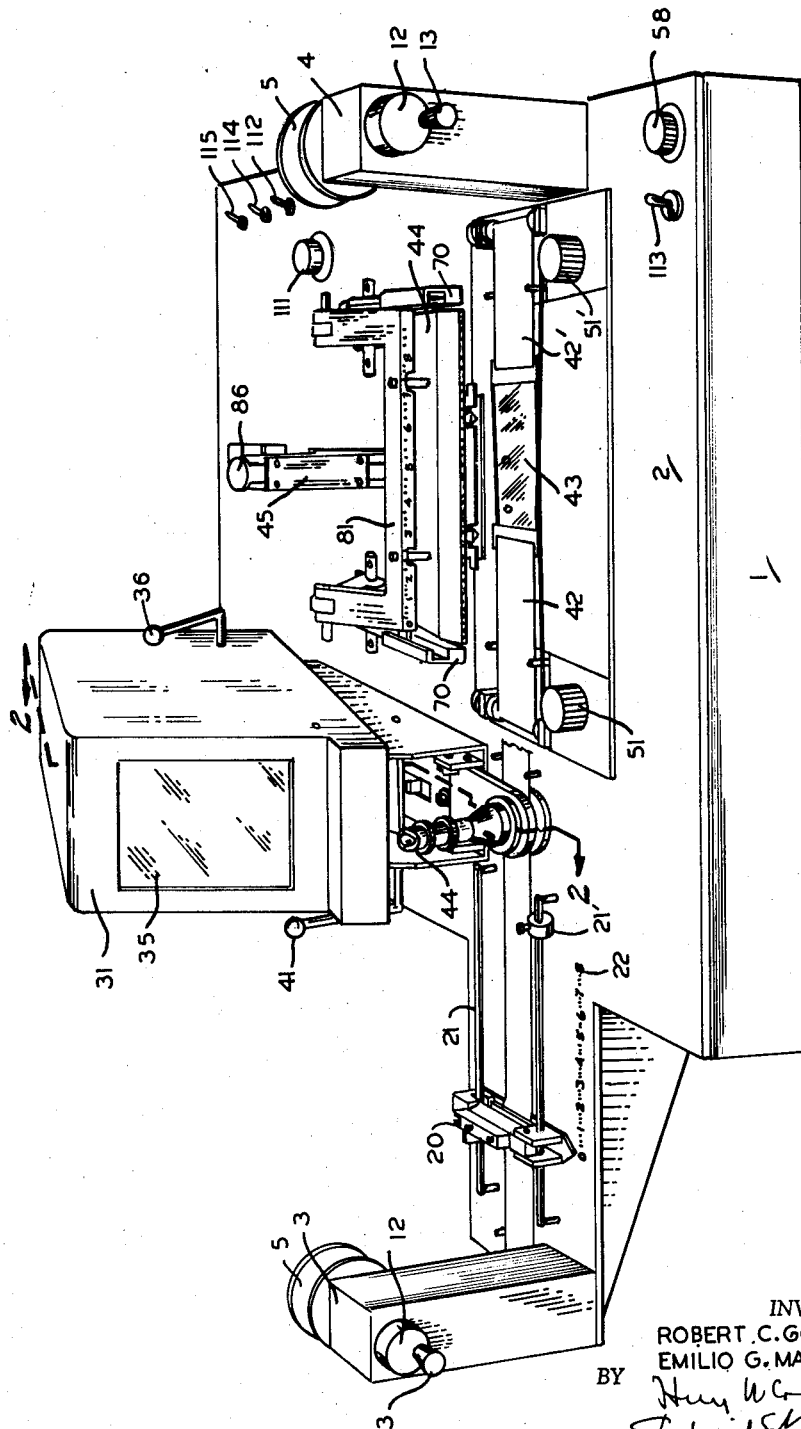
FIG. 1 is a perspective front view of the apparatus showing the working mechanism of the top printing area and of the viewing head.

Referring now to FIG. 1, there is shown a housing 1 in which various elements of the operating mechanism of our novel device are enclosed. Mounted on the cover 2 of the housing are hollow standards 3 and 4, each of which supports a rotatable shaft for supporting a microfilm spool 5. One of these shafts is shown at 6 in FIG. 7. A motor 8 drives a shaft 7. The shaft 7 carries a pulley 9 and the shaft 6 carries a pulley 10. A driving belt 11 connects the two pulleys whereby pulley 10 and shaft 6 are driven by motor 8. The shaft 6 may also be rotated manually by means of disc 12 having knobs 13 thereon.

Figure 7:
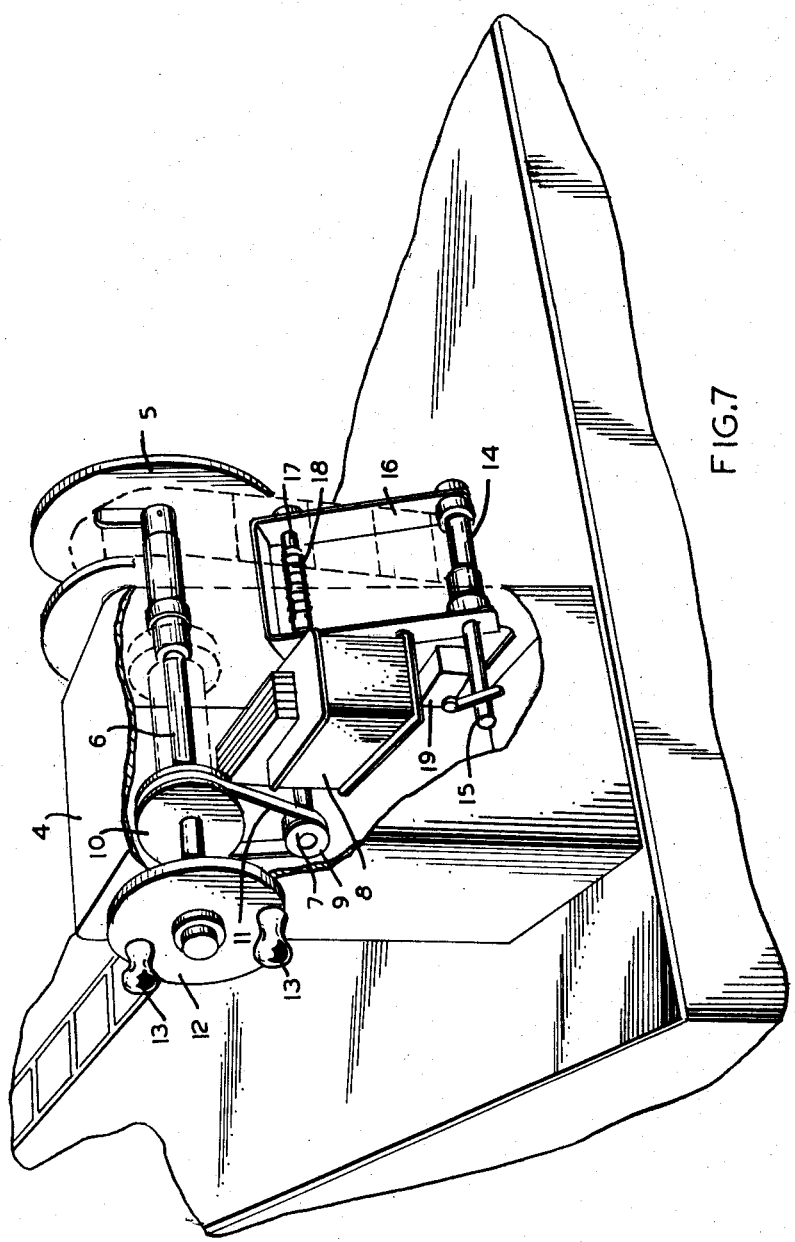
FIG. 7 is a detail view showing the automatic take-up device for the film stock with parts of the enclosure cut away to show the operating means.

Automatic means are provided for taking up the slack in the microfilm should any develop as it is being wound from one spool onto the other. The means for automatically taking up the slack is shown in FIG. 7 and comprises an idler roller 14 having a pin 15 extending therefrom. The roller 14 and pin 15 are carried by a slack sensing bracket 16 pivoted on a pin 17 extending from standard 4. A spring 18 mounted on pin 17 biases the bracket 16 toward the film. The pin 15, which is caused to move in an arcuate path by the oscillation of bracket 16, operates a switch 19 which starts and stops motor 8. The construction described above is duplicated with respect to standard 3.

A slider 20 slides on rails 21 provided with a stop 21' mounted on cover 2. The film is passed through the slider which is then locked to the film and may be used to move the film manually a desired distance. A scale 22 is provided on the cover 2 parallel to and adjacent the path of movement of the slider to indicate the distance the slider is moved.

Figure 2:
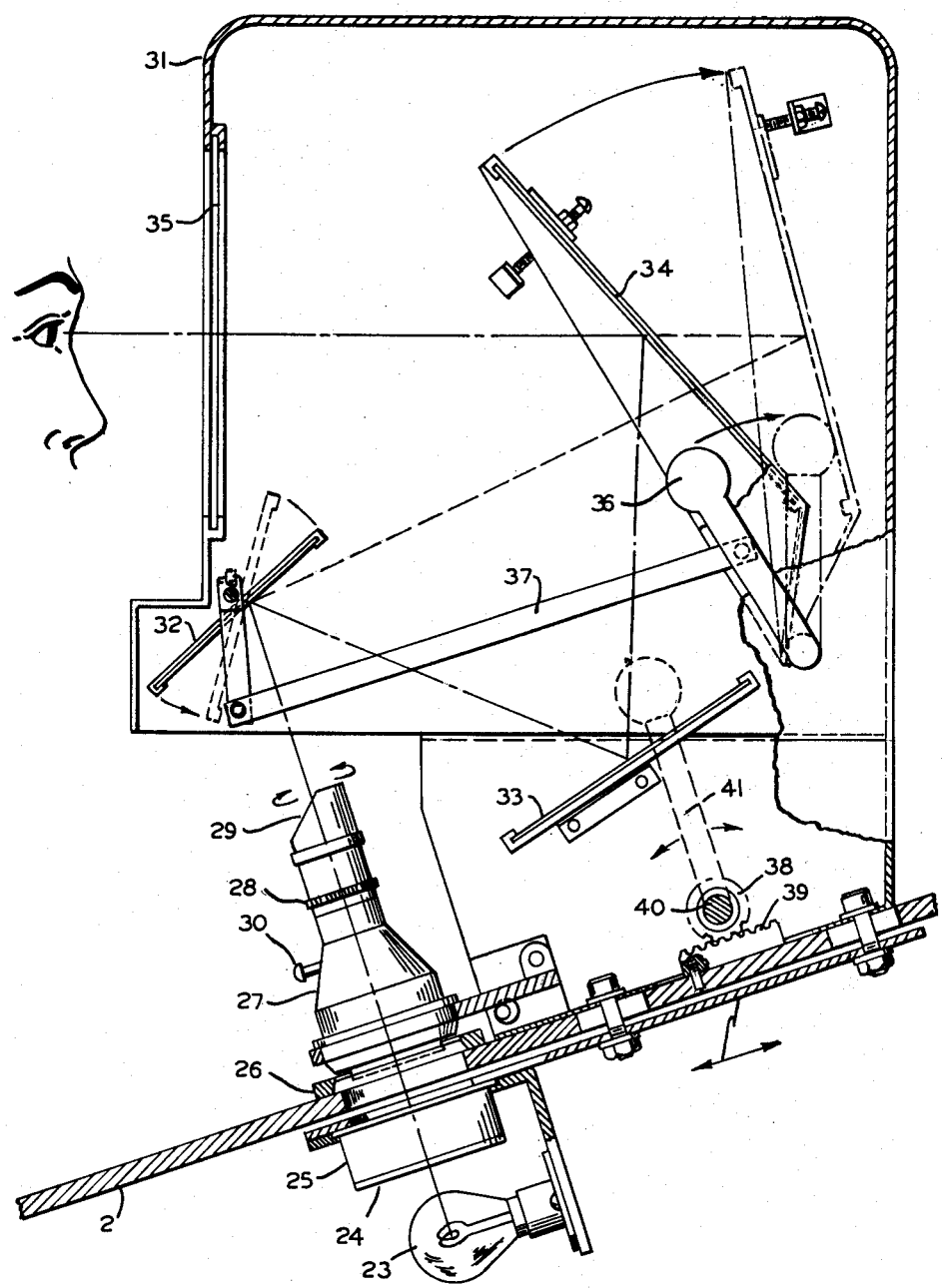
FIG. 2 is a cross-sectional view of our novel viewing mechanism taken along line 2—2 of FIG. 1.

The viewing mechanism is best shown in FIG. 2. It comprises a condenser lamp 23, a condenser lens 24 mounted in a housing 25 above the lamp, a film backup glass 26, a lens barrel 27, a projector lens 28, a prism 29 and a focus lock 30. A housing 31 is positioned above the prism 29. Within the housing there is positioned a first stage mirror 32 upon which the image is projected by the prism, a second stage mirror 33 onto which the image from mirror 32 is reflected and a third stage mirror 34 onto which the image from mirror 33 is reflected. The image on mirror 34 may be viewed through screen 35 in the front wall of housing 31.

Means are provided for reversing the image produced on mirror 34 by the system of mirrors described above. For this purpose, the mirrors 32 and 34 are both pivotally mounted in the housing. An operating lever 36 is connected to mirror 32 by a link 37. The lever 36 is also suitably connected to mirror 34. By moving lever 36 from the full line position shown in FIG. 2 to the dotted line position shown therein, mirrors 32 and 34 are rotated from the full line position to the dotted line position shown in the figure. The reflection of the image thereby takes place directly from mirror 32 to mirror 34 and mirror 33 is by-passed, thereby reversing the image as seen through screen 35.

The viewer may be adjusted transversely relative to the film. This is accomplished by means of gear 38 meshing with rack 39 mounted on cover 2. The gear 38 is mounted on a shaft 40 extending through the sides of the housing 31. Shaft 40 is actuated by a lever 41 attached thereto outside the housing 31.

After passing through the viewing mechanism, the film passes to the printing mechanism. The printing mechanism comprises printing shades 42 and 42' (FIG. 1), a printing glass 43, a platen 44, a card-holding and moving device 45 associated with the platen, cooling means, and actuating mechanism for these elements.

As shown in FIG. 5 the shades 42 and 42' are wound on two rollers 46 and 47, respectively, spaced longitudinally of the film. These rollers carry pulleys 48 and 48' for rotating the rollers to wind and unwind the shades thereon. Wire cables 49 and 49' are secured to these pulleys. The cables pass around spring actuated pulleys 50 and 50', then around control knobs 51 and 51', around guide pulleys 52 and 52' and are attached to the free ends of the shades. By actuating the control knobs 51 and 51' the distance between the free ends of the shades 42 and 42' may be determined, thereby determining the portion of the film which is to be printed.

Figure 3:
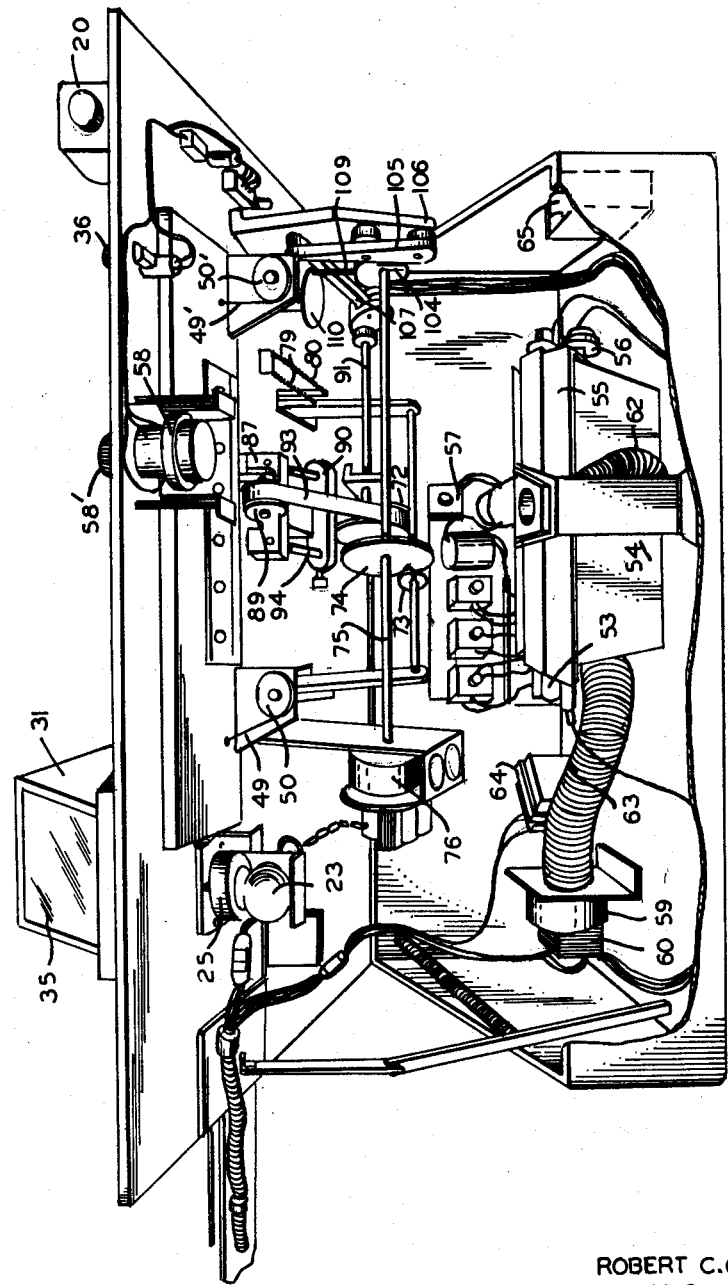
FIG. 3 is a perspective view of the internal working mechanism of our device with the main plate in raised position to expose the working mechanism.

Positioned within the housing 1, below the printing glass 43 is an ultraviolet printing lamp 53 housed within a lamp holder 54 best shown in FIG. 6. Associated with the lamp holder 54 is a shutter 55 operated by means of a rotary solenoid 56. The energization of this solenoid is controlled by relay panel 57 (FIG. 3) and timer 58 having a knob 58' by which the timer may be set for any desired length of time of exposure of the film. The lamp holder 54 is provided with a cooling chamber for cooling the lamp. Cooling air is caused to flow through the cooling chamber by means of a blower 59 operated by a motor 60 (FIGS. 3 and 6). A second cooling chamber 61 is provided underneath the printing glass 43 to cool this glass. Chamber 61 communicates with the cooling chamber in the holder 54 by means of duct 62 and the latter cooling chamber communicates with the blower 59 by means of duct 63. The path of the cooling air is shown by the arrows in FIG. 6. A transformer 64 is interposed in the electrical circuit for the lamp and the machine is provided with a safety switch 65 (FIG. 3).

The platen 44 is best shown in FIGS. 4, 4a and 4b. The platen is adapted to press a card against the portion of the film to be printed and for this purpose the underside of the platen is provided with a layer of compressible material 66, such as sponge rubber for example, in order to exert a uniform pressure on the card and film during the printing step. The platen 44 is supported by a bar 67 having rollers 68 at each end thereof which ride in grooves 69 formed in guide members 70 movably positioned at each end of the bar 67 above the cover 2 of the housing 1. Each end of the bar 67 is pivotally connected to a bell crank lever 71. The bell crank levers extends through the cover 2 into the interior of the housing 1. The ends of the levers 71 within the housing are connected together by a rod 72 which carries a cam follower 73. The cam follower 73 rides on a cam 74 mounted on a shaft 75 driven by a motor 76.

Guide members 70 are connected to levers 77 which are pivoted to bell crank levers 71 at 78 whereby the levers 71 and 78 may be moved in unison and the levers 71 may also move relative to levers 77 by movement of cam follower 73. The cam follower 73 is maintained against cam 74, and the platen 44 is returned to its inoperative position, away from the film, by springs 79 and 80 attached to levers 71 and 77, respectively (FIG. 3).

Bar 67 carries on the front face thereof a scale 81 which is similar to scale 22 previously mentioned. The parts are so arranged that when, upon movement of the film, the desired image appears on the screen and the slider 20 is then clamped to the film at the extreme left-hand end of the guide rails 21 as shown in FIG. 1, and manually moved to the right and stopped opposite a number on scale 22, the desired frame of the film which was viewed on the screen of the viewer is automatically positioned opposite the corresponding number on scale 81. By proper adjustment of the shades 42—42', the desired frame may then be printed.

Figure 8:
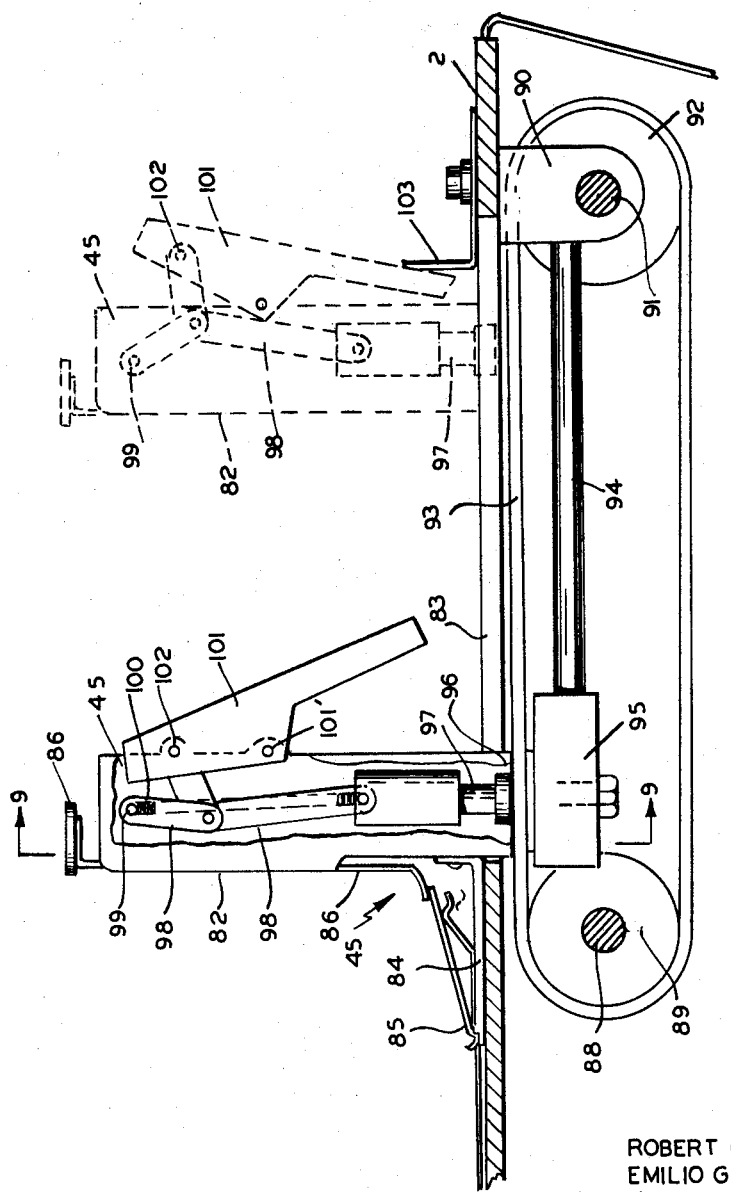
FIG. 8 is a side view of the card holder showing the mechanism for operating the same.
Figure 9:
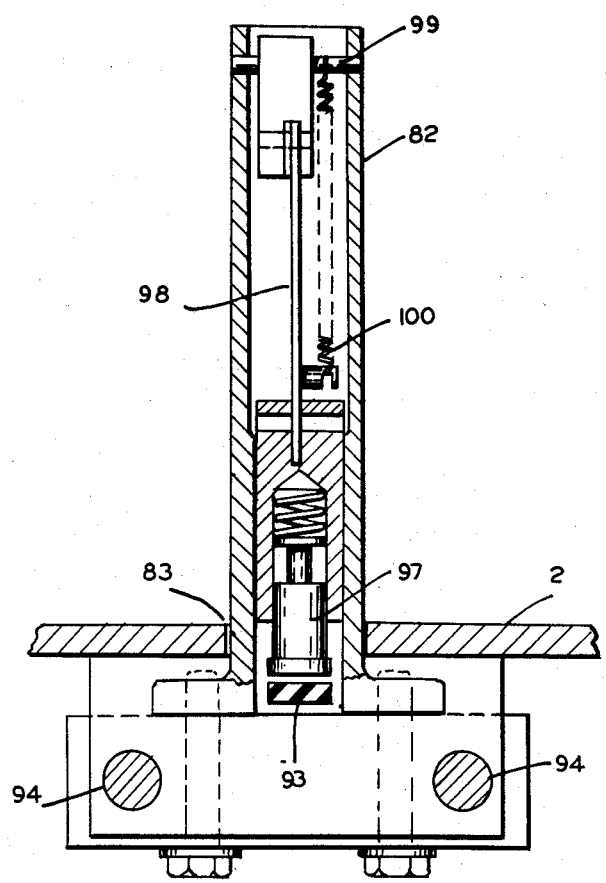
FIG. 9 is a cross-section along line 9—9 of FIG. 8.

The card-holding and moving device 45 is best shown in FIGS. 8 and 9. This device comprises a vertically disposed, horizontally movable housing 82 extending through an elongated slot 83 in cover 2 of housing 1. Rigidly secured to housing 82 near the lower end thereof but above cover 2 and resting thereon, is a platform 84. Mounted on platform 84 are spaced leaf springs 85, the outer ends of which are free to press down on the platform and the inner ends of which contact a lever 86 movable vertically along the outer face of the housing 82. By pressing down on lever 86, the outer ends of the spring 85 are raised to permit the insertion and removal of an edge of a card between the outer ends of the springs and the platform and, upon release of the lever, the springs 85 return to their normal position to securely hold the card in position.

Secured to the underside of cover 2 adjacent the front end of slot 83 is a bracket 87 (FIG. 3) which supports a shaft 88 upon which is rotatably mounted an idler pulley 89. Another bracket 90 is secured to the underside of the cover 2 adjacent the rear end of slot 83 and in alignment with bracket 87. Journalled in bracket 90 is a shaft 91 to which is pinned a pulley 92 in line with pulley 89. A belt 93 is passed over the two pulleys. Two parallel rods 94 extend between brackets 87 and 90. These rods function as guide rails for a carriage 95 to which the lower end of housing 82 is rigidly secured. The carriage 95, as shown in FIG. 8, is positioned between the lower and upper runs of belt 93 and the lower end of the housing 82 is provided with slots 96 in the sides thereof to permit the upper run of the belt to pass therethrough.

Within the housing 82, adjacent the lower end thereof is positioned a vertically movable spring pressed pin 97 having a head at its lower end. The pin is suspended from a toggle joint 98 pivoted on a pin 99 positioned on the wall of the housing near the top thereof. A tension spring 100 secured at one end to pin 99 and at its other end to the lower end of the toggle joint tends to collapse the toggle joint. A lever 101 is pivoted intermediate its ends to the wall of the housing 101'. The lever 101 is connected to the toggle joint at 102 above its pivot 101'. By pivoting lever 101 to swing the upper end thereof inwardly of the housing, the toggle joint is straightened, thereby moving pin 97 downwardly and pressing it against belt 93. A reverse movement of lever 101 collapses the toggle and moves pin 97 away from the belt. An adjustable stop is positioned at the rear end of the slot 83 in the path of movement of the lower end of lever 101 and when, upon movement of the housing 82 to the rear of the slot, the lower end of lever 101 comes in contact with stop 103, the lever 101 is pivoted to collapse the toggle.

A step by step movement is imparted to the belt by driven pulley 92 and shaft 91. For the purpose of imparting a step by step rotation to shaft 91, driven shaft 75 is provided with a cam 104 (FIG. 3) which actuates a lever 105, the lower end of which is pivoted at 106 to a projection extending from the cover 2. The upper end of the lever 104 is pivoted to one end of another lever 107. The other end of lever 107 is pivoted at 108 to shaft 91. Lever 107 carries on the upper surface thereof a pin 109 which cooperates with an adjustable, normally stationary cam 110 to prevent reverse rotation of shaft 91. Cam 110 may be set in any desired position relative to pin 109 by knob 111.

A main switch 112 is provided to control the flow of electric current to the machine and to energize lamp 53. In addition, other switches are provided to control the energization of various electrical operating means. Thus, switch 113 controls the viewer lamp 23, switch 114 controls the flow of current to switch 15 and winding motor 8 and switch 115 controls motor 76.

In operating the machine, the main switch 112 is first turned on. This energizes the printing lamp 53 and warms up the component parts of the machine, the shutter 55 being closed. While the machine is warming up, a roll of microfilm is placed on shaft 6 of the left-hand standard 3 and the film passed manually under idler roller 14 of the slack sensing bracket 16, then over the cover 2, past the viewer 22, over the printing glass 43, under roller 14 of slack sensing bracket 16 mounted on standard 4 on the right-hand end of the machine and then wound on spool 5 mounted on standard 4. Switch 114 is now turned on. Any slack in the film is taken up at either or both ends of the machine by energization of winding motor or motors 8 by switch 19 controlled by slack sensing bracket 16. Switch 113 is now turned on to energize the viewer lamp 23 and when, upon continued movement of the film, the desired image appears on the screen of the viewing mechanism, the slider 20 is clamped onto the film at the left-hand end of rails 21 and the slider with the film is manually pushed until the slider is positioned opposite any desired number on scale 22. The parts are so arranged that this movement of the film automatically positions the frame containing the desired image as viewed on screen 35 opposite the corresponding number on scale 81. Should the image appearing on the screen appear reversed, it can be flipped over on the screen by actuating lever 36. The image can also be adjusted on the screen by turning prism 29. The shades 42 and 42' are then adjusted by actuating knobs 51—51' to leave exposed only the frame of the film containing the desired image. Lever 86 of the card-holding and conveying mechanism is then depressed and an edge of a sensitized card is placed on the edge of platform 84, which card is securely held in place by springs 85 upon release of lever 86. The carriage 95 and housing 82 are manually moved to the front end of slot 83, thereby placing the card over the exposed frame of the film on printing glass 43. The housing 82 is then clamped to belt 93 to move therewith by actuation of lever 101 to straighten the toggle joint 98 and press pin 97 against the belt. Switch 115 is then turned on to energize motor 76 to rotate shaft 75 which, through the medium of cam 74, follower 73 and levers 71 and 77 moves platen 44 and guide members 70 forwardly and over the card, and then downwardly to press the card against the film on printing glass 43. The timer 58 is set for the desired exposure time and when the platen presses the card against the film, the shutter 55 is opened by automatic relay 57 energizing solenoid 56. After the proper exposure time, as determined by the setting of the timer 58 which controls the relay, the solenoid 56 is de-energized and the shutter 55 returns to the closed position. The cam 74 then permits the platen 44 and its guide members 70 to return to their up or inoperative position. The belt 93 driven by shaft 91 and pulley 92 imparts a movement to the card-holding device to the rear of the slot 83 a distance permitted by the setting of the cam 80 coacting with pin 109 which moves the card held by the card-holding device transversely of the film and the same or another image may be printed on the same card by the operation of the platen and the shutter as already described. The card is of greater width than the film. When the card-holding device has been moved to the rear of the slot so that the lever 101 comes in contact with stop 103, the toggle joint 98 is collapsed and the pin 97 moves away from belt 93. Lever 86 is then depressed, the card removed and another card inserted in its place and the various operations described above may be repeated.

We claim:

An apparatus for printing a desired section of a roll of microfilm upon a segment of a sensitized card having a capacity of several such prints which comprises a first rotatable support for a roll of microfilm, a second rotatable support spaced from the first support and aligned therewith whereby a roll of film placed on the first support may be unwounded from the roll and wound on the second support, means for taking up slack in the film, a printing mechanism positioned between the two supports including a translucent exposure plate, means movable over said plate for masking the undesired picture elements of the unwounded film on the printing mechanism while leaving the picture elements to be printed unmasked, a light source beneath said plate, shutter means for the light source, means for moving said shutter means to expose the film to said light, an adjustable holder for placing a photosensitive card on said film, drive means for moving said holder transversely of said film in incremental steps, means for pressing the card against the film, timing means controlling the successive operations of actuating said pressing means, making the exposure, and releasing said pressing means, the timing means controlling all of said operations during the interval before each incremental step of said drive means, and a viewer positioned between the first support and said printing mechanism whereby an operator may select the section to be printed by observing the viewer.

References Cited in the file of this patent

UNITED STATES PATENTS

| | | |
|---|---|---|
| 708,770 | Johnson | Sept. 9, 1902 |
| 2,158,001 | Dazey | May 9, 1939 |
| 2,160,750 | Meyer | May 30, 1939 |
| 2,235,844 | Nelson | Mar. 25, 1941 |
| 2,402,929 | Sutherland | June 25, 1946 |
| 2,481,850 | Lindner | Sept. 13, 1949 |
| 2,762,277 | McChesney | Sept. 11, 1956 |
| 2,869,447 | Youngberg | Jan. 20, 1959 |
| 2,943,553 | Drewett | July 5, 1960 |